Nov. 4, 1941. E. E. WEMP Re. 21,937

CLUTCH

Original Filed Feb. 9, 1938 3 Sheets-Sheet 1

INVENTOR.
Ernest E. Wemp

BY
Barnes, Kisselle, Laughlin & Raisch
ATTORNEYS

Nov. 4, 1941. E. E. WEMP Re. 21,937

CLUTCH

Original Filed Feb. 9, 1938 3 Sheets-Sheet 2

INVENTOR.
Ernest E. Wemp

BY
Barnes, Kisselle, Laughlin & Raisch
ATTORNEYS

Nov. 4, 1941. E. E. WEMP Re. 21,937

CLUTCH

Original Filed Feb. 9, 1938 3 Sheets-Sheet 3

INVENTOR.
Ernest E. Wemp

BY Barnes, Kisselle, Laughlin & Raich
ATTORNEYS

Reissued Nov. 4, 1941 Re. 21,937

UNITED STATES PATENT OFFICE 21,937

CLUTCH

Ernest E. Wemp, Detroit, Mich.

Original No. 2,206,988, dated July 9, 1940, Serial No. 189,547, February 9, 1938. Application for reissue June 16, 1941, Serial No. 398,340

18 Claims. (Cl. 192—68)

This invention relates to clutches and it has to do with improvements in a clutch especially designed for use with automotive vehicles.

Among the objects of the invention is the provision of an improved construction wherein coil springs may be used for exerting all or part of the clutch packing pressure and wherein the movable clutch pressure plate is driven, held centered and permitted to be moved by flexible metal members. Both the springs and the flexible metal members are circumferentially arranged, and in accordance with the invention the arrangement and construction is such that the flexible metal members do not interfere with or reduce the number of springs which may be used. Moreover, the invention is directed to certain structural features of an improved nature and to the combination of a cover plate for the clutch and pressure plate mounting wherein certain parts of the cover plate have sufficient flexibility to accommodate pressure plate movement. These points will be better understood as the detailed description progresses:

Figure 1:
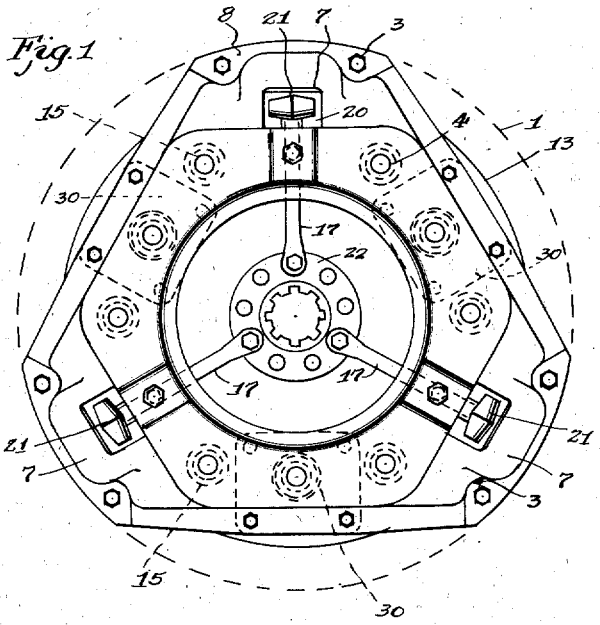
Fig. 1 is a rear elevational view of the clutch constructed in accordance with the invention.
Figure 2:
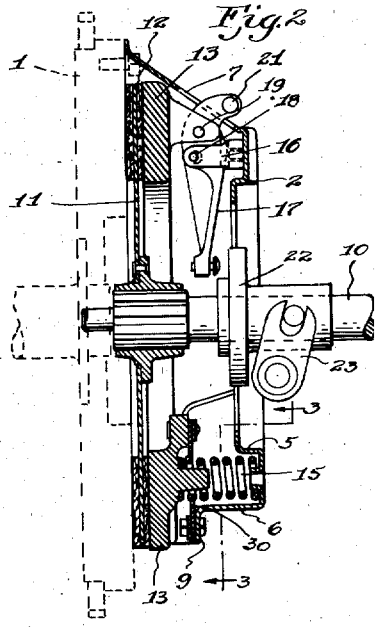
Fig. 2 is a sectional view taken through the clutch.
Figure 3:
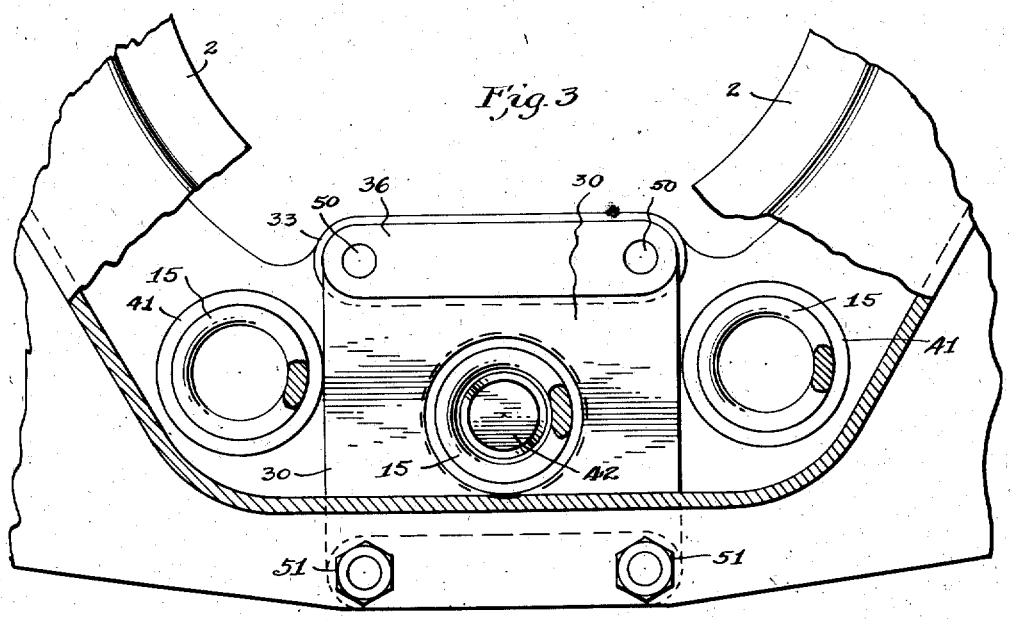
Fig. 3 is an enlarged view taken substantially on line 3—3 of Fig. 2.

The clutch construction as illustrated herein embodies a flywheel 1 of an engine and a cover plate generally indicated at 2 secured to the flywheel by cap screws 3. The cover plate shown is of the form disclosed and covered in Patent No. 2,079,888 of May 11, 1937. This cover plate is generally of polygonal form and specifically of triangular form, and may be stamped from sheet metal. It has some depth so as to provide a rear wall 4 and it may have a center reenforcing flange 5. The three sides of the cover plate, as illustrated at 6, are disposed on chordal lines and extend forwardly from the rear wall toward the fly-wheel, but these walls are arched so as to bridge the pressure plate. The pressure plate is illustrated at 13. At the corners the cover plate has angularly disposed and forwardly extending inclined walls 7. The periphery of the plate presents a flange 8 substantially at what may be termed the corners for the reception of the cap screws, and a flange 9 along the forward edge of the sides 6. In reality it may be considered that there is but one peripheral flange of which portions 8 and 9 are parts.

A driven shaft is illustrated at 10 upon which is mounted a driven disc 11 with facing material 12 arranged to be packed between the flywheel and the pressure plate. A plurality of coil springs is disposed between the pressure plate and the rear wall 4 of the cover plate, each spring being illustrated at 15. As shown in Fig. 1 nine springs are illustrated in this particular clutch, there being three groups of springs of three springs each spaced relative to the three releasing levers. The cover plate carries a yoke for each lever as illustrated at 16, and each lever 17 is pivotally mounted to the yoke as at 18 and pivotally connected to the pressure plate as at 19. The cover plate may have apertures 20 through which an unbalanced weighted end at each lever extends as illustrated at 21. A clutch throw-out bearing is illustrated at 22 and arranged to engage the inner ends of the levers for clutch control, and this bearing may be shifted by means of a yoke 23.

Insofar as this invention is concerned the levers may or may not be provided with the unbalanced centrifugal weights, although this is the form of clutch shown herein to exemplify the invention. It will be understood that the clutch may be normally engaged by the springs 15, and when rotated the unbalanced centrifugal weights increase the clutch packing pressure.

Figure 4:
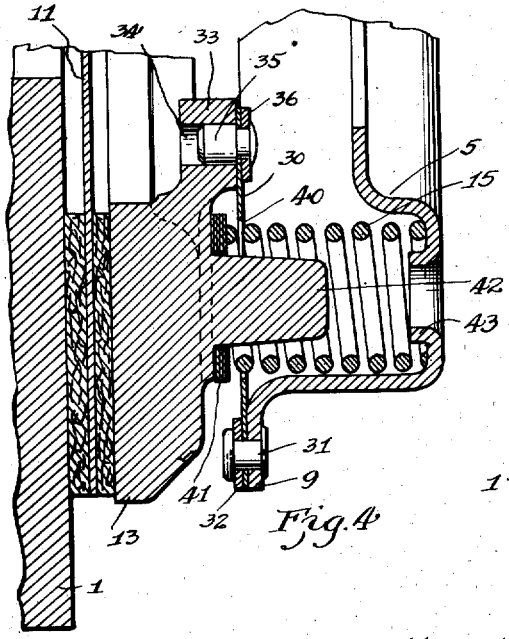
Fig. 4 is a sectional view similar to Fig. 6, showing another arrangement, and showing the clutch engaged.
Figure 5:
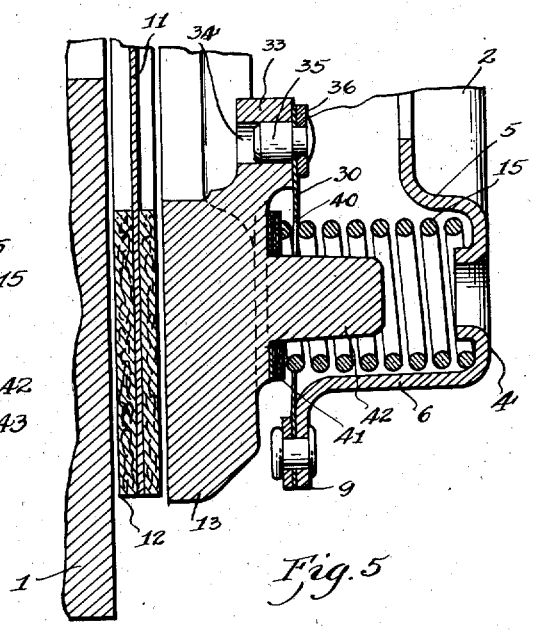
Fig. 5 is a sectional view similar to Fig. 4, illustrating the clutch disengaged.

The pressure plate 13 is driven, held centered and permitted to shift axially by a plurality of flexible driving members preferably of sheet metal; these may be termed segmental drive members; each driving member may take the form of a rectangular piece of sheet metal as illustrated at 30. These sheet metal members are secured to the flange 9, as shown in Figs. 4 and 5, and in one form of the invention rivets 31 are used for the attachment, there preferably being a strip of mild steel 32 disposed between the heads of the rivets and the flexible members 30 which are preferably of a higher carbon steel. The plates 30 extend inwardly and the pressure plate is provided with abutments or lugs 33. Suitable recesses or apertures 34 are provided in the abutments for the reception of studs 35 preferably press fitted into the apertures. The studs 35 have a reduced neck, and the end of each stud is spun over or riveted to the plate 30 preferably with the interposition of a washer or strip of mild steel 36.

As will be noted in reference to Fig. 1 the sheet metal plates are located generally where they would normally interfere with the springs. In some clutches of smaller size, as for example, the one illustrated in Fig. 1, six springs may suffice, in which case there may be one spring one each side of each sheet metal plate. However, where additional capacity is needed each sheet metal plate may be provided with an aperture 40, and a spring 15 extends through this aperture and seats on the pressure plate. A heat insulating washer 41 may be used between each spring and the pressure plate. At these points the pressure plate may be provided with projections 42 cast thereon and which may be drilled into or machined for balancing purposes. The wall 4 of the cover plate may be fashioned with an inwardly extending formation 43 for guiding and centering each spring.

In making the clutch assembly the flexible plates may be riveted to the cover plate and then the pressure plate may be placed into a subassembly with the cover plate and springs by press fitting the studs 35 into the recesses. Then this subassembly may be brought up to the flywheel and secured in position by the cap screws 3. When repairs are to be made this subassembly of the pressure plate and cover plate and other associated parts may be removed and, if necessary, the pressure plate may be removed by driving out the studs 35.

In use the clutch is normally engaged as shown in Fig. 4. To release the clutch the operator may press on the usual clutch pedal to shift the release bearing 22. The springs are not called upon to supply the total clutch pressure which is needed where the unbalanced centrifugal weights are used, and in this regard the organization may be of the type covered in Patent No. 2,021,973 of November 26, 1935.

The driving members 30 serve to drive the pressure plate from the cover plate, also serve to center the pressure plate and to hold it on center and permit the pressure plate to shift axially and silently for clutch control. For example, when the clutch is disengaged the pressure plate is shifted to the right from the Fig. 4 position to the Fig. 5 position, and the flexible plates permit of this movement. However, the center to center distance between the points of attachment of the plates to the cover plate and to the pressure plate, or in other words, from the center of the rivets 31 to the center of the studs 35, varies with axial shift of the pressure plate. In the form shown the plates 30 are flat so that the plates themselves do not take care of this variation, although they are flexible to permit axial movement. The cover plate, however, has sufficient elasticity and flexibility to accommodate for this variation. For example, the distance between centers is greater in Fig. 5 than it is in Fig. 4, and the wall portion 6 of the cover plate flexes or bends to take care of this situation. This movement, of course, is rather small but necessary for a nicety of clutch actuation. The cover plate construction accommodates for this variation nicely, inasmuch as the walls 6 are disposed at a considerable angle relative to the line of force tending to bend the same. The cover plate, therefore, has flexible portions to which the flexible segmental driving plates are secured.

Figure 6:
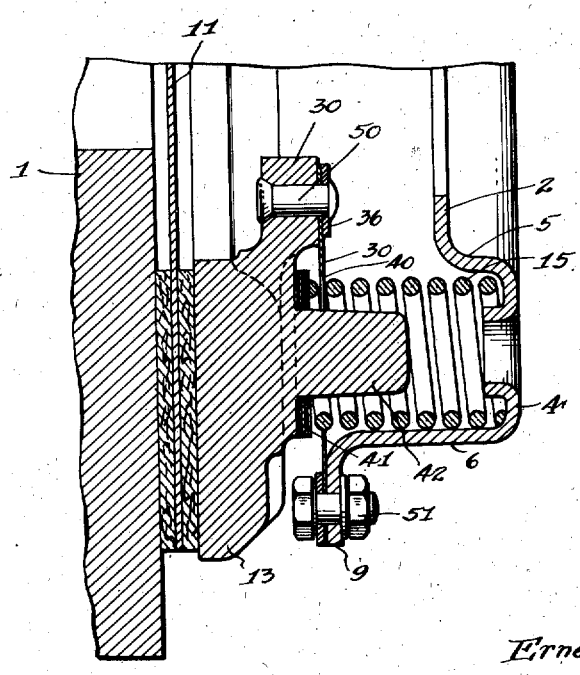
Fig. 6 is a sectional view taken substantially on line 6—6 of Fig. 3 showing the clutch engaged.

In Fig. 6 the plates 30 are riveted as at 50 to the pressure plate and are bolted as at 51 to the cover plate. In this form the subassembly of the cover plate, pressure plate and associated parts is made by bolting the segmental drive members to the cover plate. This subassembly may then be secured to the flywheel and in subsequent disassemblies the subassembly may be removed as a unit from the flywheel and, if necessary, the pressure plate and cover plate may be separated at the points 51.

Figure 7:
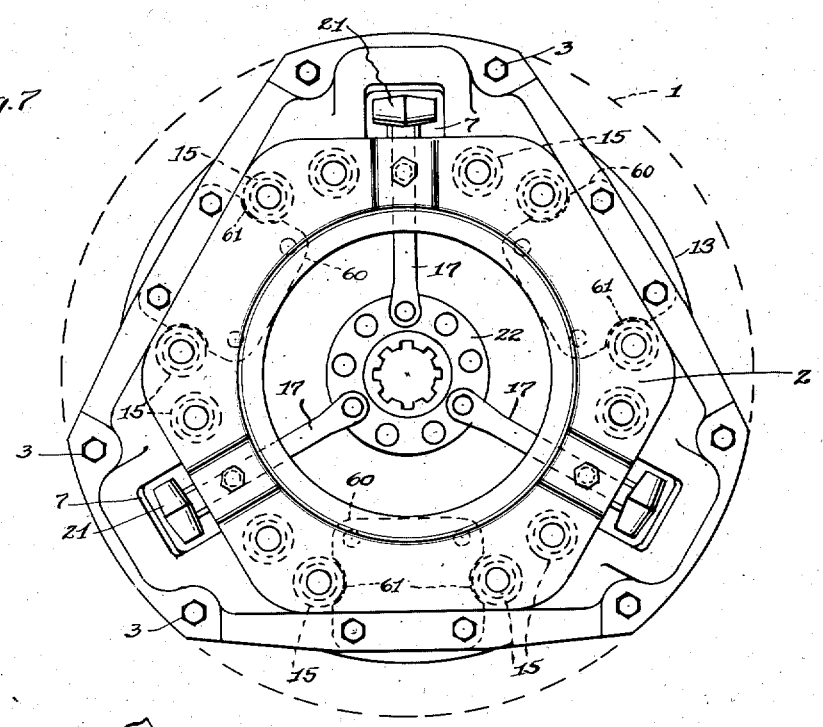
Fig. 7 is a rear elevational view of a further modified arrangement.
Figure 8:
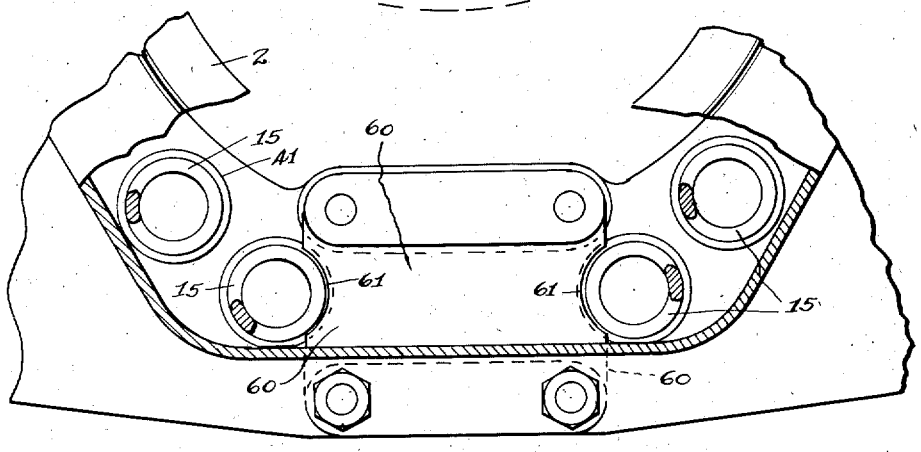
Fig. 8 is an enlarged view similar to Fig. 3 showing the Fig. 7 arrangement in more detail.

In Fig. 7 an arrangement is shown wherein the segmental drive plates are apertured or notched for the reception of more than one spring. Where a clutch of greater capacity is needed more springs may be desirable. In the form shown in Fig. 1, for example, the arrangement accommodates nine springs. The same clutch cover plate formation in the modification shown in Fig. 7 may accommodate twelve springs. In this form of the invention, see also Fig. 8, the flexible plates 60 have apertures 61 in opposite edge portions. The apertures 61 are not complete holes but are in the nature of scallops in the edges. Thus two springs may be located between each lever and each segmental plate, the springs being indicated by the reference character 15 which is used above. Of each two springs one may be located relatively close to the lever and the other located in one of the recesses or scallops, as illustrated. Thus the springs in this form are arranged in three groups of four each.

In some of the claims appended hereto it is specified that the plates have an aperture for the passage of a spring therethrough, and the term "aperture" is to be considered as applicable to the scalloped formation, which in a sense is an aperture, although not completely bounded by metal of the plate.

I claim:

1. In a clutch, the combination of driving and driven members, a clutch cover plate, a plurality of circumferentially arranged coil springs between the cover plate and one driving member for packing the clutch members together, said one driving member being inside the cover plate, a plurality of flexible metal plates arranged in circumferentially spaced relationship inside the cover plate and connected to the cover plate and to the said one driving member for driving, centering and permitting axial shift of said one driving member, said plates each having an aperture therein and one of said springs extending through the apertures in each of the plates.

2. In a clutch, the combination of a driving member, a cover plate secured thereto, a pressure ring inside the cover plate, a driven member between the driving member and pressure ring, a plurality of flexible metal plates arranged in circumferentially spaced relationship and connected at their outer portions to the cover plate and extending inwardly across the pressure ring inside the cover plate and connected to the inner portion of the pressure ring, each flexible metal plate having an aperture therein and a plurality of circumferentially spaced coil springs between the cover plate and pressure ring with one spring extending through the aperture in each flexible metal plate.

3. In a clutch, the combination of a driving member, a cover plate attached thereto and having flexible wall portions, an axially shiftable pressure ring inside the cover plate, a driven disc between the driving member and pressure ring, said pressure ring having circumferentially arranged abutments at its inner portion which project axially from the body of the pressure ring, a plurality of circumferentially arranged flat and flexible metal plates each connected at its outer portion to a flexible wall portion of the cover plate and connected at its inner portion to one of said abutments and disposed inside the cover plate, whereby the flexible plates extend across the pressure ring between the cover plate and pressure ring and serve to center, drive and permit axial movement of the pressure ring, and a plurality of circumferentially arranged coil springs between the cover plate and pressure ring.

4. In a clutch, the combination of a driving member, a cover plate attached thereto, an axially shiftable pressure ring inside the cover plate, a driven disc between the driving member and pressure ring, said pressure ring having circumferentially arranged abutments at its inner portion which project axially from the body of the pressure ring, a plurality of circumferentially arranged flexible metal plates inside the cover plate and each connected at its outer portion to the cover plate and connected at its inner portion to one of said abutments, whereby the flexible plates extend across the pressure ring between the cover plate and pressure ring and serve to center, drive and permit axial movement of the pressure ring, each flexible plate having an aperture therein, and a plurality of circumferentially arranged coil springs between the cover plate and pressure ring with one of the springs extending through the aperture in each flexible metal plate.

5. In a clutch, the combination of a driving member, a cover plate secured to the driving member and having side portions, an axially shiftable pressure plate, a driven member between the driving member and pressure plate, and said side portions each having a flange a portion of which is spaced from the driving member, a plurality of flexible metal plates each connected at its outer portion to one of said flanges, and each extending inwardly across the pressure plate in spaced relation thereto and connected to the pressure plate at its inner portion for centering, driving and permitting axial shift of the pressure plate, and a plurality of circumferentially arranged coil springs between the cover plate and pressure plate.

6. In a clutch, the combination of a driving member, a cover plate secured to the driving member and having side portions, an axially shiftable pressure plate, a driven member between the driving member and pressure plate, said side portions including parts spaced from the driving member, and said side portions having a flange, a plurality of flexible metal plates each connected at its outer portion to one of said flanges, and each extending inwardly across the pressure plate in spaced relation thereto and connected to the pressure plate at its inner portion for centering, driving and permitting axial shift of the pressure plate, and a plurality of circumferentially arranged coil springs between the cover plate and pressure plate, each flexible metal plate having an aperture therein through which one of said springs passes.

7. In a clutch, the combination of a driving member, a cover plate secured to the driving member and having side portions, an axially shiftable pressure plate, a driven member between the driving member and pressure plate, said side portions including parts spaced from the driving member and said side portions having an outwardly extending flange, a plurality of flat flexible metal plates each connected at its outer portion to one of said flanges and each extending inwardly across the pressure plate in spaced relation thereto and connected to the pressure plate at its inner portion for centering, driving and permitting axial shift of the pressure plate, and a plurality of circumferentially arranged coil springs between the cover plate and pressure plate, each flexible metal plate having an aperture therein through which one of said springs passes.

8. In a clutch, the combination of a driving member, a pressure plate, a cover plate having outer side walls extending substantially in an axial direction, said side walls having outwardly directed flanges, a pressure plate having abutments at its inner portion projecting toward the cover plate, a plurality of flat metal plates each connected adjacent its outer portion to one of said flanges and connected adjacent its inner portion to one of the abutments for driving the pressure plate and permitting axial shift thereof, said plates extending across the pressure plate in spaced relation thereto and positioned between the pressure plate and the rear portion of the cover plate, and a plurality of coil springs arranged between the cover plate and pressure plate, said side walls constituting flexible portions for flexing upon axial shift of the pressure plate.

9. In a clutch, the combination of a flywheel, a pressure plate, a driven member between the flywheel and pressure plate, a cover plate, said cover plate being substantially of triangular form with side portions disposed substantially on chordal lines and arranged to bridge edge portions of the pressure plate, a clutch release lever adjacent each of the three corners of the triangular shape, a flexible sheet metal plate adjacent each side of the triangular shape and overlapping the pressure plate and each connected at its outer edge to a chordal wall of the cover plate and at its inner edge to the inner portion of the pressure plate, each flexible plate having an aperture therein, and a group of coil springs adjacent each side of the triangular shape and arranged between the cover plate and pressure plate, one spring of each group extending through the aperture in the adjacent flexible metal plate.

10. In a clutch, a cover plate, a pressure plate inside the cover plate, a plurality of circumferentially arranged flexible sheet metal plates inside the cover plate, means connecting the outer portion of each sheet metal plate to the cover plate, the inner portion of the pressure plate having apertures therein, and studs fixedly secured to the inner portion of each flexible sheet metal plate and press fitted into the apertures of the pressure plate.

11. In a clutch, a cover plate, a pressure plate inside the cover plate, a plurality of circumferentially arranged flexible sheet metal plates, inside the cover plate, rivets for securing the outer portion of each sheet metal plate to the cover plate, the inner portion of the pressure plate having apertures therein, and studs riveted to the inner portion of each sheet metal plate and press fitted into the apertures of the pressure plate.

12. In a clutch, the combination of driving and driven members, a clutch cover plate, a plurality of circumferentially arranged coil springs between the cover plate and one driving member for packing the clutch members together, a plurality of substantially rectangular flexible metal plates arranged in circumferentially spaced relationship inside the cover plate and each connected at one edge to the cover plate and at the opposite edge to the said one driving member for driving, centering and permitting axial shift of said one driving member, said plates each having one or more cutout portions for the passage of one or more springs through the same.

13. In a clutch, the combination of driving and driven members, a clutch cover plate, a plurality of circumferentially arranged coil springs between the cover plate and one driving member for packing the clutch members together, a plurality of flexible metal plates arranged in circumferentially spaced relationship and connected to the cover plate and to the said one driving member for driving, centering and permitting axial shift of said one driving member, each flexible metal plate having a recess formed in opposite edges for the passage of a spring through each of the recesses.

14. In a clutch, a clutch cover plate having circumferentially spaced parts for attachment to a driving member, a pressure plate within the cover plate adapted to engage a driven member and pack the driven member against the driving member, the cover plate having portions between the said spaced parts and which are spaced axially from the said spaced parts, a plurality of flexible members connected to the said portions and extending inwardly substantially across the pressure plate in spaced relation thereto and connected to the pressure plate adjacent its inner portion for centering, driving and permitting axial shift of the pressure plate, and packing means reacting against the cover plate for urging the pressure plate axially.

15. In a clutch, a clutch cover plate, a pressure plate within the cover plate and having a body in the form of a ring adapted to engage a driven member, said cover plate having a back portion and circumferentially spaced frontal parts for attachment to a driving member and edge portions between the frontal parts which are spaced axially from the frontal parts, a plurality of flexible metal members connected to said edge portions of the cover plate and extending inwardly substantially across the pressure plate in spaced relation to the back face of the ring body thereof and connected thereto adjacent its inner portion for centering, driving and permitting axial shift of the pressure plate, and packing means reacting against the cover plate for urging the pressure plate axially for engagement of the driven member.

16. In a clutch, a clutch cover plate having a back portion and a side wall formation, the edge of the side wall formation having an outwardly extending flange, a pressure plate within the cover plate having a body of ring form adapted to engage a driven member, the side wall formation of the cover plate being relatively deep at circumferentially spaced locations and the flange thereat constituting frontal portions for attachment to a driving member, the portions of the flange between the said frontal portions receding from the frontal portions to expose peripheral edge portions of the pressure plate, a plurality of flexible members connected to the flange between the frontal portions and extending inwardly across the ring body of the pressure plate and connected to the pressure plate adjacent its inner portion for centering, driving and permitting axial shift of the pressure plate, and spring means reacting against the cover plate for urging the pressure plate axially.

17. In a clutch, a clutch cover plate, a pressure plate within the cover plate and having a body in the form of a ring adapted to engage a driven member, said cover plate having a back portion and circumferentially spaced frontal parts for attachment to a driving member and edge portions between the frontal parts which are spaced rearwardly from the said frontal parts, a plurality of flexible members connected to said edge portions of the cover plate and to the pressure plate for centering, driving and permitting axial shift of the pressure plate, and clutch engaging packing means reacting against the cover plate for urging the pressure plate axially.

18. In a clutch, a cover plate, a pressure plate within the cover plate, said cover plate having a back portion and a side wall formation, circumferentially spaced parts of the side wall formation extending from the back portion to a position forward of the pressure plate and forming frontal portions for attachment to a driving member, the intermediate portions of the side wall formation being of relatively less depth to expose edge portions of the pressure plate, a plurality of flexible members connected to the intermediate portions and extending inwardly and connected to the pressure plate for centering, establishing a driving connection between the cover plate and pressure plate and permitting axial shift of the pressure plate relative to the cover plate, and packing means reacting against the cover plate for urging it away from the back portion of the cover plate.

ERNEST E. WEMP.